Jan. 27, 1970 W. PISKE 3,491,455
APPARATUS FOR PREVENTING THE STICKING OR ADHERING OF A
PENDULUM AT THE STOP MEMBERS LIMITING ITS DEFLECTION
Filed June 21, 1968 2 Sheets-Sheet 2

INVENTOR
WILFRIED PISKE
BY Jacobi & Davidson
ATTORNEYS

United States Patent Office 3,491,455
Patented Jan. 27, 1970

3,491,455
APPARATUS FOR PREVENTING THE STICKING OR ADHERING OF A PENDULUM AT THE STOP MEMBERS LIMITING ITS DEFLECTION
Wilfried Piske, Heerbrugg, Switzerland, assignor to Wild Heerbrugg AG, Heerbrugg, Switzerland, a corporation of Switzerland
Filed June 21, 1968, Ser. No. 739,039
Claims priority, application Switzerland, June 27, 1967, 8,985/67
Int. Cl. G01c 9/08
U.S. Cl. 33—220                    6 Claims

ABSTRACT OF THE DISCLOSURE

An apparatus for preventing the sticking or adhering of a pendulum at the stop means limiting the deflection of the pendulum, which comprises means for pressing the pendulum against one of the stop means prior to the oscillating return or swinging back of the pendulum into its rest position. The aforementioned one stop means incorporates means for delivering an impulse to the pendulum upon release of the force exerted upon said pendulum by the pressing means, so that said pendulum is effectively detached from contact with said one stop means.

BACKGROUND OF THE INVENTION

The present invention relates to an improved apparatus for preventing the sticking or adhering of a pendulum at the stop members limiting its deflection.

Pendulums are known in the construction of measuring instruments, especially as components of geodetic instruments. In this environment they serve to measure, or also to compensate for, the faulty leveling of the components or entire instruments. In the first situation they carry out the same function as liquid bubble levelers and are generally referred to as clinometers, whereas in the second situation they should eliminate the influence of faulty leveling by suitable control of optical or mechanical components, and generally are referred to as compensating devices.

What is common to all of these constructions is that the pendulum can freely swing or oscillate in only a limited range. This does not, however, result in any drawback from the standpoint of carrying out measuring operations. Devices, such as theodolites or levelers, in which such pendulums are employed, are in any case preleveled when they are set up. Therefore, by means of the pendulum it is only necessary to measure or compensate inclinations with respect to the horizontal of a few angle minutes. In practical constructions, the operating or working range thus always generally lies between ±10 and ±20 angle minutes.

However, simultaneous, with the limitation of the operating range of the pendulum it is possible to achieve an increase of the measuring accuracy. As a general rule, the pendulum suspensions consist of elastic spring elements. As is known, the deflection of a spring is not a completely reversible operation. Depending upon the magnitude and the direction of the previous deflection, the spring assumes a different rest position. The reason for this is based upon the inherent hysteresis of every resilient material.

However, the limitation of the operating range of a pendulum by mean of stop members can produce disadvantageous consequences. It can happen that during practical use the pendulum has the tendency of sticking or adhering to these stop members instead of oscillating back to its starting or rest position. This sticking or adhering effect is brought about by many different causes. To mention a few, by way of example, the stop or impact members could be soiled, absorbed moisture or electrostatic charges could constitute only a few of the reasons why such would occur. Since the restoring forces of the pendulum—because of the small working or operating region—are extremely small, very small adhesion forces are already sufficient to bring about such a sticking of the pendulum.

Previously, one was content to release the pendulum in the event it adhered to a stop member, by slightly knocking or striking against the tripod or the instrument. Constructions have already become known to the art in which an optical bundle of light rays, which is provided with an oscillating element, is screened when the pendulum bears against the stop member. However, in such construction the sticking or adhering of the pendulum is only indicated, but not prevented.

SUMMARY OF THE INVENTION

Accordingly, it is a primary object of the present invention to provide an improved apparatus of the aforementioned type which effectively overcomes the drawbacks of the prior art structures.

Another, more specific object of the present invention relates to an improved apparatus which completely prevents and overcomes the sticking or adhering of a pendulum at its stop members.

Now, in order to implement these and still further objects of the present invention, which will become more readily apparent as the description proceeds, the invention contemplates the provision of means, through the aid of which prior to the momentary swinging or oscillation of the pendulum back into its rest position and which is associated with a measurement operation, the pendulum is pressed against one of the stop members which limits its deflection. Then, upon removing the effect which causes this pressure or force an impulse acts from such stop member upon the pendulum which separates the pendulum from such stop member, and thus renders ineffectual the sticking or adhesive forces present between the stop member and the pendulum. As a result, the pendulum can always oscillate or swing back into its momentary rest position independent of the presence and the magnitude of such adhesive forces.

BRIEF DESCRIPTION OF THE DRAWING

The invention will be better understood, and objects other than those set forth above, will become apparent, when consideration is given to the following detailed description thereof. Such description makes reference to the annexed drawings wherein.

DESCRIPTION OF THE PREFERRED EMBODIMENTS

Figure 1:
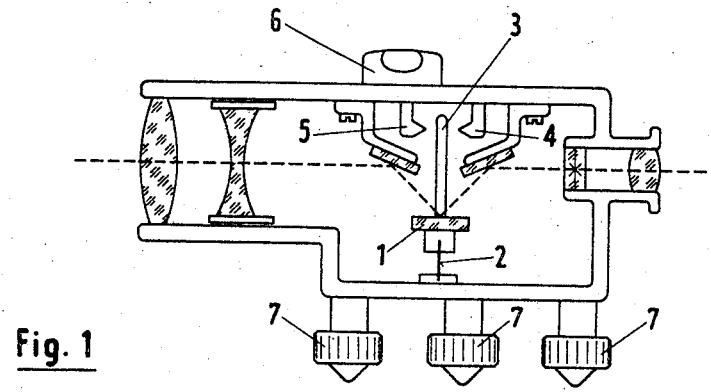
FIGURE 1 schematically illustrates a pendulum as a component of a leveling instrument.

Describing now the drawing, FIGURE 1 depicts, for instance, a pendulum as a component of a leveling instrument. The path of rays of the observation telescope is guided in known manner by means of the oscillating mirror 1. The oscillating system in the example under consideration is constructed as a Holweck-Lejay pendulum. It is coupled by the leaf or blade spring 2 with the instrument housing. Its working or operating range is defined by the pin 3 and the stop members 4 and 5. The instrument is preleveled by means of the liquid bubble leveler 6 and the base screws 7.

Figure 2:
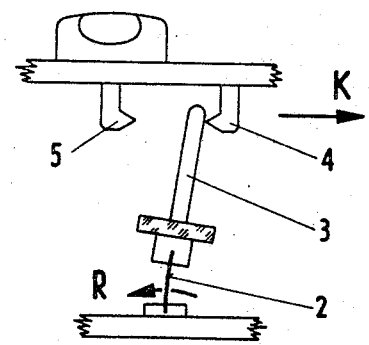
FIGURE 2 depicts a pendulum which has become stuck at its stop member.

In FIGURE 2 there is depicted a pendulum where the pin 3 sticks to the stop member 4. The adhesive or adhering force K is greater than the restoring moment R which is exerted by the leaf spring 2, so that the pendulum is prevented from oscillating or swinging back into its rest position.

Figure 3:
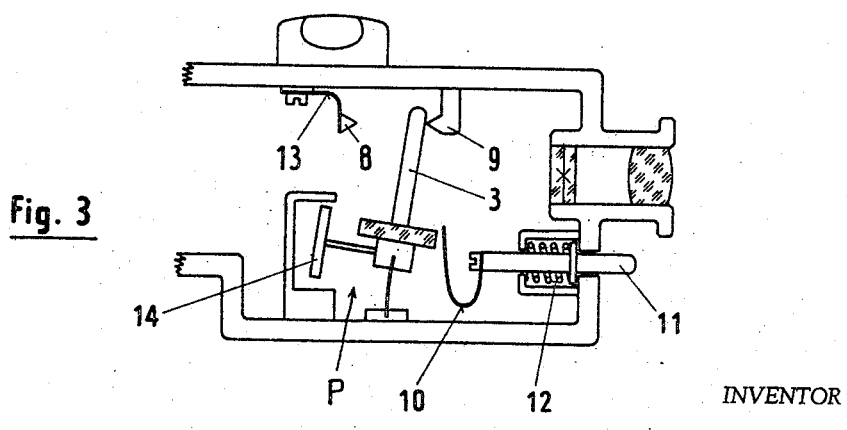
FIGURE 3 is a preferred embodiment of inventive apparatus.

On the other hand, FIGURE 3 illustrates the inventive apparatus for preventing such sticking or adhering of a pendulum, generally designated by reference character P. Analogous to FIGURE 2, it is here also assumed that the pendulum P is sticking or adhering to the stop member 9. Now, if the knob or push button 11 is actuated by displacing it in axial direction, then the flexible spring member 10 contacts the pendulum P. Owing to the exerted force, this pendulum is initially detached from the stop member 9 and then pressed against the stop member 8. This stop member 8 is constructed to be resilient. More precisely, this is achieved by providing a weak leaf spring 13 which tends to give a certain amount when pressure is exerted upon the stop member 8. Naturally, it would be possible to use different constructions for the resilient stop member than that shown by way of example. Thus, for instance, there could be used a suspended cable or the like for the stop member. Hence, element 13 could be also conceptually considered to be such a cable or the like.

Now, if the pressure exerted upon the knob 11 is removed, then the strong spring member 12 presses this knob member 11 quite quickly back into its starting position. Consequently, the force exerted by the spring member 10 upon the pendulum P also disappears. The force exerted by the stop member 8 upon the pendulum, because of the previous deflection of the spring member 13, or cable, now delivers an impulse to the pendulum. This impulse insures in every case, even during the presence of a sticking or adhesive effect, that the pendulum P will be displaced away from the stop member 8 and swing back into its rest position. The dampening device 14 provides an oscillation characteristic which is accommodated to the intended use of the pendulum and, in particular, prevents the pendulum during such time as it swings back from again coming into contact with the stop member 9.

The described action is also achieved if the pendulum sticks or adheres to the stop member 8.

It is a matter of properly selecting and matching the spring members 10, 12 and 13 in order to select the driving impulse such that the sticking or adhering action can be prevented under all conceivable circumstances.

The knob or push button 11 is illustrated in FIGURE 3 in such a manner that it can be manually operated. Naturally, a different type of operation for this knob 11 would be possible. For instance, it could be possible to provide, by way of example, an electric relay for this purpose, if the apparatus which contains the pendulum should be used at an inaccessible location. This could occur, for instance, with clinometers.

Furthermore, the use of the inventive apparatus is possible in conjunction with all types of pendulum constructions.

If prior to each measurement operation the knob 11 is actuated, then a sticking or adhering of the pendulum at its stop members will always be prevented. At the same time there will be achieved that the direction of swinging or oscillating back of the pendulum will always be the same, whereby the influence of the electrostatic friction occurring at the support of the pendulum or the hysteresis appearing with elastic spring support elements, will be suppressed. As a result, the adjustment accuracy of the pendulum and therefore the measurement accuracy of the device, the component of which is the pendulum, will be increased.

Figure 4:
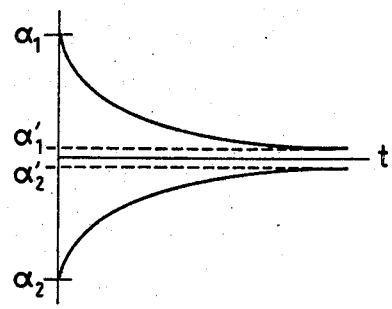
FIGURE 4 graphically depicts the swinging or oscillating back operation of an aperiodic dampened pendulum.

FIGURE 4 illustrates the course of the swinging or oscillating back operation of an aperiodic dampened pendulum. Reference characters $a_1$ and $a_2$ designate the deflections of the pendulum limited by the stop members, with respect to the position of symmetry. It is known that the rest position which the pendulum assumes is dependent upon the preceding deflection. With point- or knife-edge supports such is predicated upon the electrostatic friction, with spring supports upon the hysteresis of the resilient material.

The rest position $a'_1$ is thus associated with the deflection $a_1$, the rest position $a'_2$ with the deflection $a_2$. The difference $a'_1-a'_2$ corresponds to the influence of the electrostatic friction or the hysteresis, respectively.

Now, if the pendulum prior to each measurement is pressed by means of the inventive apparatus against the stop member 8, then it will always swing back from the same direction.

Figure 5:
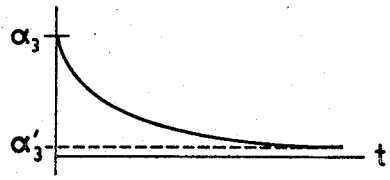
FIGURE 5 graphically depicts the swinging or oscillating back operation of an aperiodic dampened pendulum which is equipped with the inventive apparatus.

This is depicted in FIGURE 5. With an aperiodic dampening of the pendulum such will always assume the rest position $a'_3$ after a previous deflection $a_3$. Thus, the influence of the electrostatic friction or the hysteresis is completely suppressed.

Therefore, it is possible by means of the inventive apparatus to attain a considerable increase of the adjustment accuracy of a pendulum.

It should be apparent from the foregoing detailed description, that the objects set forth at the outset to the specification have been successfully achieved.

What is claimed is:

1. Apparatus for preventing the sticking or adhering of a pendulum at the stop means limiting the deflection of the pendulum, comprising a pendulum, at least two stop means, one on either side of said pendulum, for limiting the deflection of said pendulum, means for pressing the pendulum against one of said stop means prior to the oscillating return of said pendulum into its rest position, said one stop means incorporating means for delivering an impulse to said pendulum upon release of the force exerted upon said pendulum by said pressing means, whereby said pendulum is detached from contact with said one stop means.

2. Apparatus as defined in claim 1, further including dampening means cooperating with said pendulum in order to always achieve a similar oscillating return characteristic of said pendulum.

3. Apparatus as defined in claim 1, wherein said pressing means for pressing said pendulum against said one stop means comprises a spring means for exerting said force upon said pendulum, and a push button means for operably engaging said spring means with said pendulum.

4. Apparatus as defined in claim 1, wherein said means for delivering an impulse to said pendulum which detaches said pendulum from said one stop means incorporates a resilient element cooperating with said one stop means.

5. Apparatus as defined in claim 4, wherein said resilient element is defined by spring means.

6. Apparatus as defined in claim 4, wherein said resilient element is defined by tensioned cable means.

References Cited

UNITED STATES PATENTS 2,986,615   5/1961   Hardway _____ 73—71.2

LEONARD FORMAN, Primary Examiner

CHARLES E. PHILLIPS, Assistant Examiner